United States Patent
James et al.

(10) Patent No.: US 8,478,771 B2
(45) Date of Patent: Jul. 2, 2013

(54) SYSTEMS AND METHODS RELATED TO A TEMPORAL LOG STRUCTURE DATABASE

(75) Inventors: Brian B. James, Stone Mountain, GA (US); Eric T. Hardison, Lawrenceville, GA (US); David L. Janicek, Key West, FL (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 13/251,199

(22) Filed: Sep. 30, 2011

(65) Prior Publication Data

US 2013/0086092 A1 Apr. 4, 2013

(51) Int. Cl.
*G06F 17/30* (2006.01)

(52) U.S. Cl.
USPC ......................................................... 707/758

(58) Field of Classification Search
USPC ......................................................... 707/758
See application file for complete search history.

(56) References Cited

U.S. PATENT DOCUMENTS

2012/0197868 A1* 8/2012 Fauser et al. .................. 707/714

OTHER PUBLICATIONS

"NILFS Log-Structured File System Implementation for Linux by NTT/Verio", Retrived on Nov. 9, 2011, 5 pages. Available at: http://www.enotes.com/topic/NILFS.

Jones, M., "Next-generation Linux file systems: NiLFS(2) and exofs", IBM, Advancing Linux file systems with logs and objectsm, Skill Level: Intermediate, Developer Works, Nov. 3, 2009, pp. 1-12.
Layton, Jeffrey B., "NILFS: A File System to Make SSDs Scream", Linux Magazine, Jun. 2, 2009, pp. 1.5. Available at: http://www.linux-mag.com/id/7345/.
Liebert, Nolan "A brief guide to NiLFS2", Sioux Falls Technology Examiner, Nov. 16, 2009, pp. 1-3. Availablet at: http://www.examinercom/technology-in-sioux-falls/a-brief-guide-to-nilfs2.
Muth, Peter, et al., "Design, Implementation, and Performance of the LHAM Log-Structured History Data Access Method", Proceedings of the 24th VLDB Conference New York, USA, 1998, pp. 1-12.
Rosenblum, M., et al., "The Design and Implementation of a Log-Structured File System", Sprite Operation Systems, Jul. 24, 1991, pp. 1-15.

* cited by examiner

*Primary Examiner* — Sheree Brown
(74) *Attorney, Agent, or Firm* — Brake Hughes Bellermann LLP

(57) ABSTRACT

In one general aspect, a computer-implemented method includes a computer-implemented method that includes executing, using at least one processor, instructions recorded on a non-transitory computer-readable storage medium. The method includes receiving a request to insert a data record within a database of a data collection system. The data record can be placed within a buffer in a main memory of the data collection system. A record data structure and a record index structure associated with the data record are defined. The record data structure and the record index structure are stored within a storage chunk in a storage medium of the database, and the storage medium is different than the main memory. The storage chunk has an associated index that can be used to retrieve the data record and the storage chunk can include other data records different than the data record associated with the received request.

22 Claims, 14 Drawing Sheets

Log File Structure

| Control Page | Chunk 1 | | Chunk 2 | Chunk 3 | Chunk 4 | Chunk 5 | Chunk 6 |
|---|---|---|---|---|---|---|---|
| | Index | Data | | | | | |

FIG.4

Control Page Structure

| LDSA | Chunk Directory Header | Chunk Directory Entry | Chunk Directory Entry | Chunk Directory Entry | Chunk Directory Entry |
|---|---|---|---|---|---|
| | Coarse Index | Coarse Index | Coarse Index | Coarse Index | Coarse Index |

FIG.5

Chunk Structure

| Index Entries | | | | Data Entries | | |
|---|---|---|---|---|---|---|
| Index Header | Indices | Index Trl | | Data Header | Data | Data Trl |

FIG.6

Coarse Index Entry Structure

| Index ID | Format | Length | Low Value　　RBA | High Value RBA |
|---|---|---|---|---|
| | | | | |

FIG.7

Record Data Structure

| Header Length | Total length Data | Index RBA | Data | Trl Length | Total length Data |
|---|---|---|---|---|---|
| | | | | | |

FIG.8

Record Index Structure

| Header Length | Total Length | Data RBA | Index Entry (Multiple Entries) | | | | Trl Length | Offset To start |
|---|---|---|---|---|---|---|---|---|
| | | | Index ID | Format | Length | Index Data | | |

FIG.9

| Average Record Length | Number of Indices | Number of Task | Number of Log Files | Log File Size(Mb) | Buffer Size(Mb) | Number of Buffers | Inserts for all Task(Buffer Full Errors) | Elapsed Time |
|---|---|---|---|---|---|---|---|---|
| 384 | 4 | 1 | 5 | 400 | 1 | 10 | 200,000 | 00:00:02.514 |
| 384 | 4 | 3 | 5 | 400 | 1 | 10 | 600,000 | 00:00:07.389 |
| 384 | 4 | 9 | 5 | 400 | 1 | 10 | 1,800,000 | 00:00:31.741 |
| 134 | 8 | 1 | 3 | 100 | 2 | 5 | 200,000 | 00:00:01.761 |
| 134 | 8 | 3 | 3 | 100 | 2 | 5 | 600,000(10) | 00:00:05.266 |
| 134 | 8 | 9 | 3 | 100 | 2 | 5 | 1,800,000(54) | 00:00:12.852 |
| 450 | 3 | 1 | 2 | 200 | 1 | 20 | 200,000 | 00:00:02.242 |
| 450 | 3 | 3 | 2 | 200 | 1 | 20 | 600,000(9) | 00:00:06.475 |
| 450 | 3 | 9 | 2 | 200 | 1 | 20 | 1,800,000(185) | 00:00:27.725 |

FIG. 13

SYSTEMS AND METHODS RELATED TO A TEMPORAL LOG STRUCTURE DATABASE

TECHNICAL FIELD

The subject matter of the present disclosure relates to systems and methods related to a temporal log structure database.

BACKGROUND

In some temporal log structured database systems, maintaining current information may not be sufficient; rather historical data must be maintained to handle relevant queries. The underlying access method of such systems should support different forms of "time-travel" queries, large keys, high insertion rates and retrieval rates, and should be able to manage a large volume of data with an efficient use of storage media. Indexing temporal databases can be an important and challenging problem, due to the large amount of data to be indexed and the various "time-travel" types of queries that have to be supported.

An important and desirable feature for a temporal database system can be the ability to sustain high insertion rates. Such a requirement can arise, for example, in transaction monitors that are fed by transaction processing systems such as, for example, the CICS ("Customer Information Control System") transactional server or the IBM DB2 relational model database. For example, a transaction management system can retain each unit of recovery across various z/OS subsystems in order to provide a correlated view of the entire business transaction across the diverse z/OS subsystems. In addition to querying within the database system, a current unit of recovery, queries asking for the history of a specific unit of recovery in a given time interval, as well as queries asking correlated view of units of recovery can be supported. The results of these queries can be important for performance studies and source problem isolation.

Typically, the amount of data records to be inserted into such transactional databases is much greater than the amount of data records actually retrieved from the database at a later time. Thus, it is desirable to optimize the insertion process without being detrimental to the retrieval process.

Thus, a need exists for an access system and method for transaction-time temporal data that can meet the above-described demands of such a transaction management system and can optimize the insertion process.

SUMMARY

In one general aspect, a computer-implemented method includes executing, using at least one processor, instructions recorded on a non-transitory computer-readable storage medium, and includes receiving a request to insert a data record within a database of a data collection system. The data record can be placed within a buffer in a main memory of the data collection system. A record data structure and a record index structure associated with the data record are defined. The record data structure and the record index structure are stored within a storage chunk in a storage medium of the database, and the storage medium is different than the main memory. The storage chunk has an associated index that can be used to retrieve the data record and the storage chunk can include other data records different than the data record associated with the received request.

In another general aspect, a non-transitory computer-readable storage medium can be configured to store instructions that when executed cause a processor to perform a process. The instructions can include instructions receive at a data collection system, a request to insert a data record within a database of the data collection system. The data record is placed within a buffer in a main memory of the data collection system. A record data structure and a record index structure each associated with the data record are defined and stored within a storage chunk in a storage medium of the database. The storage medium is different than the main memory and the storage chunk has an associated index that can be used to retrieve the data record and can include other data records different than the data record associated with the received request.

In yet another general aspect, a computer-implemented method includes executing, using at least one processor, instructions recorded on a non-transitory computer-readable storage medium, and includes receiving a request to retrieve a data record within a database of a data collection system. The request includes a first search parameter including an index key associated with the data record. A search is conducted for a storage chunk from a plurality of storage chunks within a log file of the database to identify a storage chunk index that meets the first search parameter of the request. If a storage chunk from the plurality of storage chunks is identified that meets the key index of the first search parameter, the storage chunk is examined to determine if the requested data record is stored within the storage chunk based on a second search parameter associated with the data record. If the storage chunk contains the requested data record, the data record is read into a storage buffer.

The details of one or more implementations are set forth in the accompanying drawings and the description below. Other features will be apparent from the description and drawings, and from the claims.

BRIEF DESCRIPTION OF THE DRAWINGS

FIG. 4 is a schematic block diagram illustrating a log file structure, according to an embodiment.

FIG. 5 is a schematic block diagram illustrating a control page structure of the data collection system of FIG. 1.

FIG. 6 is a schematic block diagram illustrating a chunk structure of the data collection system of FIG. 1.

FIG. 7 is a schematic block diagram illustrating a coarse index entry structure of the data collection system of FIG. 1.

FIG. 8 is a schematic block diagram illustrating a record data structure of the data collection system of FIG. 1.

FIG. 9 is a schematic block diagram illustrating a record index structure of the data collection system of FIG. 1.

FIG. 13 is a summary table of the insertion rate results obtained in one example implementation of an optimized insertion process of a data collection system.

DETAILED DESCRIPTION

The systems and methods described herein can be used to optimize an insert process within a temporal log structure database. The optimization can be achieved, for example, by (1) minimizing the index creation and maintenance required by typical temporal database systems, and (2) employing a technique using minimal processor resources to manage database free-space and reuse available space. This technique frees the data base manager from performing periodic consolidation and space management tasks. The systems and methods described herein can incorporate a simple two-level index scheme having a coarse index of high and low value for each index in a group of data records (e.g., a chunk), and record level indices at the record group level. This can thereby reduce the time required to insert a record into the database and eliminate the need for periodic index management, while providing a method to quickly locate stored records.

A temporal log structured database system is described herein that can provide for an ultra fast, large capacity temporal file system and that supports user defined indices for data insert and retrieval operations. As described herein, the database system is configured to partition data inserted into the database system into successive components based on, for example, the timestamps of the record. Components can be assigned to different levels of a storage hierarchy, and incoming data can be continuously migrated through the hierarchy.

The database system and methods described herein are based on log structure data set methodology, and the need/desire to record, maintain and mine temporal data. For example, many applications maintaining only current information may not be sufficient; rather, historical data must be kept to answer all relevant queries. Such applications can include, for example, stock market information, banking, and medical information systems. Temporal database systems typically aim to support this kind of application.

The database system and methods described herein use log-structured techniques to sustain high insertion rates of data into the database system. In some implementations, the database system described herein optimizes insertion rates by initially storing all incoming data in a main memory component of the database server. When the main memory component becomes full, the data can be merged with data already on a storage disk of the database server and migrated to the disk in a bulk fashion, in a similar manner as with a log-structured file system approach. At the same time, a new index structure on the storage disk, containing both the new and the old records, can be created. Input/output (I/O) operations can use, for example, fast multi-block I/O. Components of the system may exist on different levels of a storage hierarchy. If a component becomes full, data can be migrated to the component on the next lower level.

Figure 1:
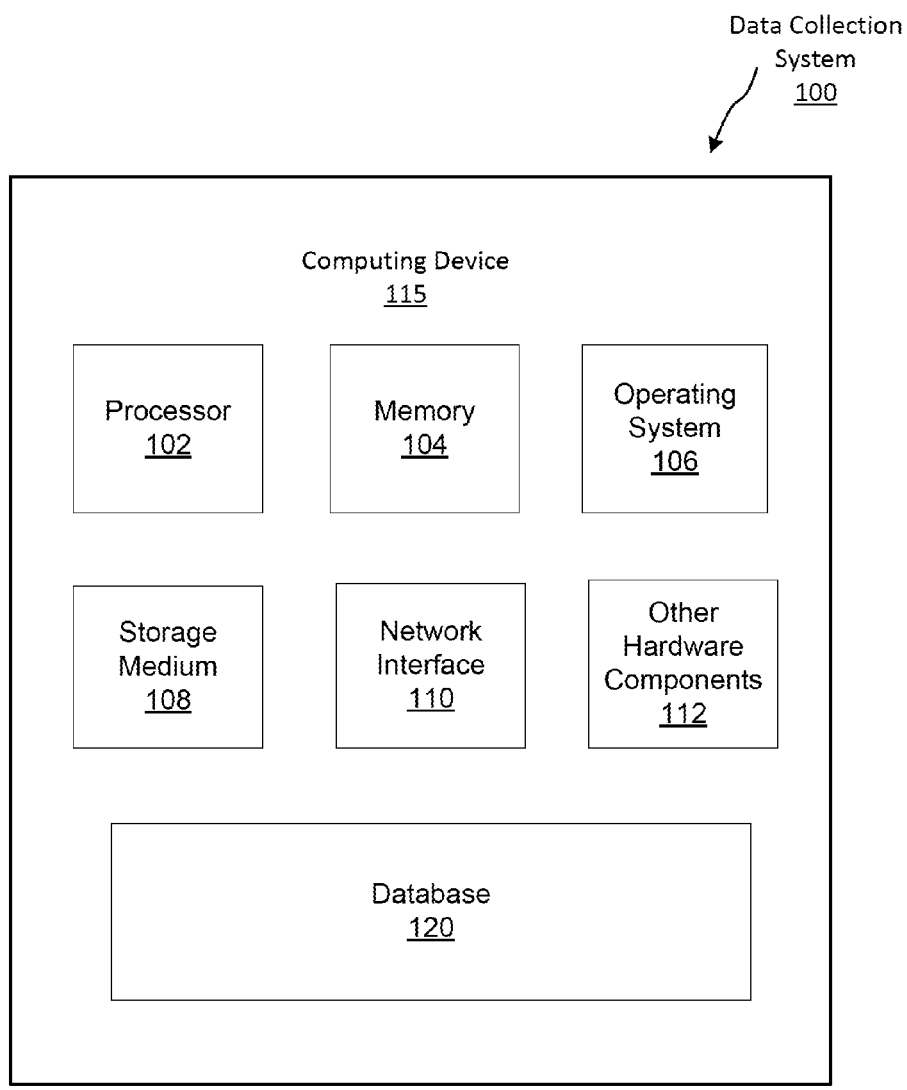
FIG. 1 is a block diagram that illustrates a data collection system for storing and providing transaction record information in a database, according to an implementation.

FIG. 1 is a schematic diagram that illustrates a temporal data collection system 100 (also referred to herein as "data collection system" or "database system"). The data collection system 100 can be embodied, for example, on one or more computing devices 115. The data collection system 100 can be, for example, a server that includes one or more computing devices 115. A single computing device 115 is shown and described in FIG. 1 for illustration purposes.

The computing device 115 can include one or more processors 102 configured to execute one or more machine executable instructions or pieces of software, firmware, or a combination thereof. The computing device 115 can include, an operating system (OS) 106 and a main memory 104 configured to store one or more pieces of data, either temporarily, permanently, semi-permanently, or a combination thereof. Further, the memory 104 may include volatile memory, non-volatile memory or a combination thereof. In some implementations, the computing device 115 may include one or more network interfaces 110 configured to associate with and communicate via one or more communication networks (e.g., a wired network, a wireless network, a cellular network, etc.). The computing device 115 can also include one or more storage mediums 108, such as a storage disk configured to store data in a semi-permanent or substantially permanent form. In some implementations, the computing device 115 may include one or more other hardware components not shown in FIG. 1, such as for example, a display or monitor, a keyboard, a touchscreen, a camera, a mouse, a touchpad, a trackpad, a video processor, etc.

The data collection system 100 also includes a database 120 stored in one or more memory components (e.g., 104, 108) of the electronic device 115. The database 120 is a temporal log file database configured to support user defined indices for data insertion and retrieval operations as described in more detail below.

Figure 2A:
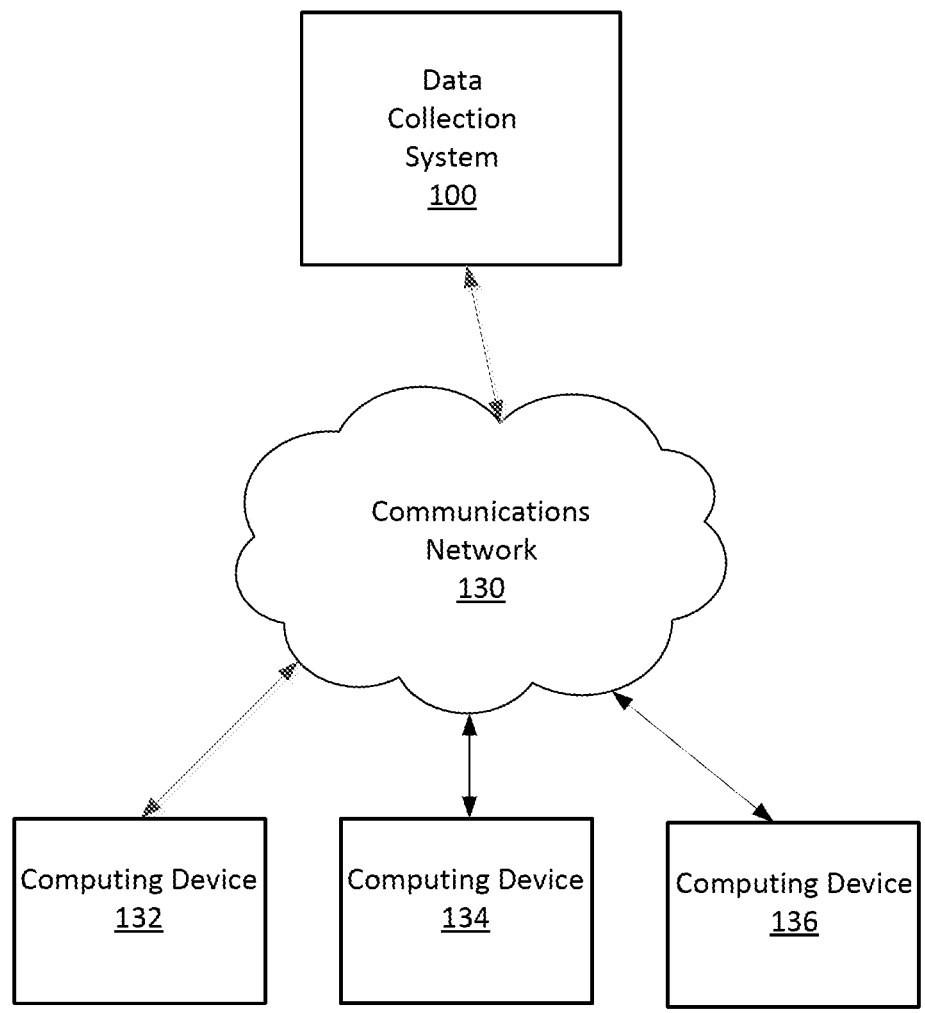
FIG. 2A is a schematic diagram of a data collections system of FIG. 1 in communication with other computing devices via a communications network.

As shown in FIG. 2A, the data collection system 100 can be in communication with other computing devices 132, 134, 136, via a communications network 130, such as, for example, the Internet. For example, the computing device 115 can be configured to access the communications network 130 using a wired or wireless (e.g., Wi-Fi) connection via the network interface(s) 110.

The computing devices 132, 134, 136 can include, for example, components described above for computing device 115. For example, the computing devices 132, 134, 136 can be, for example, a server computer that includes a database for collecting data. The data collected within the databases of the computing devices 132, 134, 136 can be communicated to the database 120 of the data collection system 100 for storage and retrieval. In some implementations, data can be directly transferred to the data collection system 100.

Figure 2B:
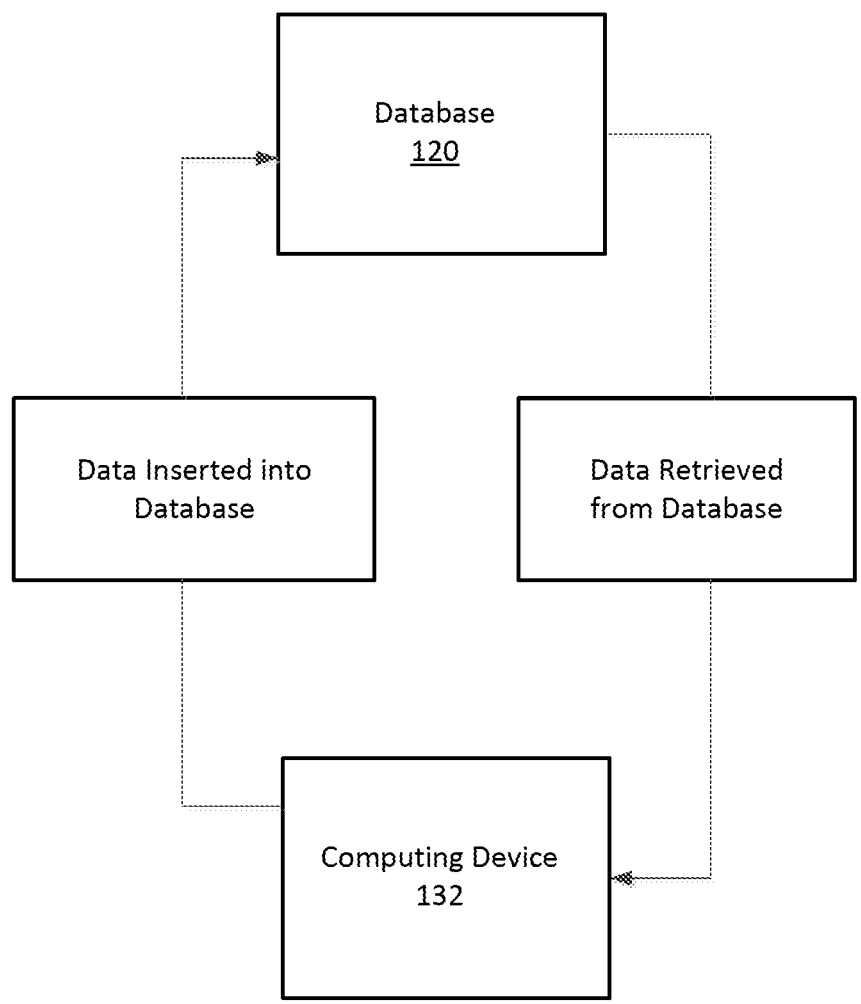
FIG. 2B is a schematic block diagram illustrating the flow of data records between a database of the data collection system of FIG. 1.

For example, as shown in FIG. 2B, the computing device 132 can be operated by a financial institution and can be used during the course of business to collect transactional data related to ATM transactions. The data collected by the financial institution can be initially stored on the computing device 132 (e.g., within a database). The data records can then be copied and stored on the database 120 of the data collection system 100, which is configured to handle a greater amount of transactional data. Thus, the financial institution can maintain a smaller system configured to handle a smaller amount of data records, and the data records can be moved periodically to the larger database 120 of the data collection system 100. Data records can then be retrieved from the database 120 at a later time/date if desired by the financial institution. Because there is a very large number of data records that need to be stored by the data collection system 100, optimizing the insertion process for the data records is desirable. Typically, the amount of data records that need to be retrieved at a later time is much lower than the amount of data records to be inserted into the data collection system 100. The systems and methods employed by the data collection system 100 can optimize the insertion process without being detrimental to the retrieval process.

As described previously, the data collection system 100 employs a unique implementation of a temporal log structure database. Records in the temporal structures can be collected in order, for example, by transaction time, and retrieved using a time span key. A "Round Robin" file system can be employed so that the most current records will eventually start replacing the least current records. Records in temporal structures are collected in order by transaction time, and retrieved using a time span indices and their associated record data are stored together in what is referred to herein as a "Chunk" described in more detail below. Chunks may be stored on a direct access storage device (DASD), such as, for example, storage medium 108 (e.g., disk storage) and can be retrieved and reused as a unit at a later time/date.

Figure 3A:
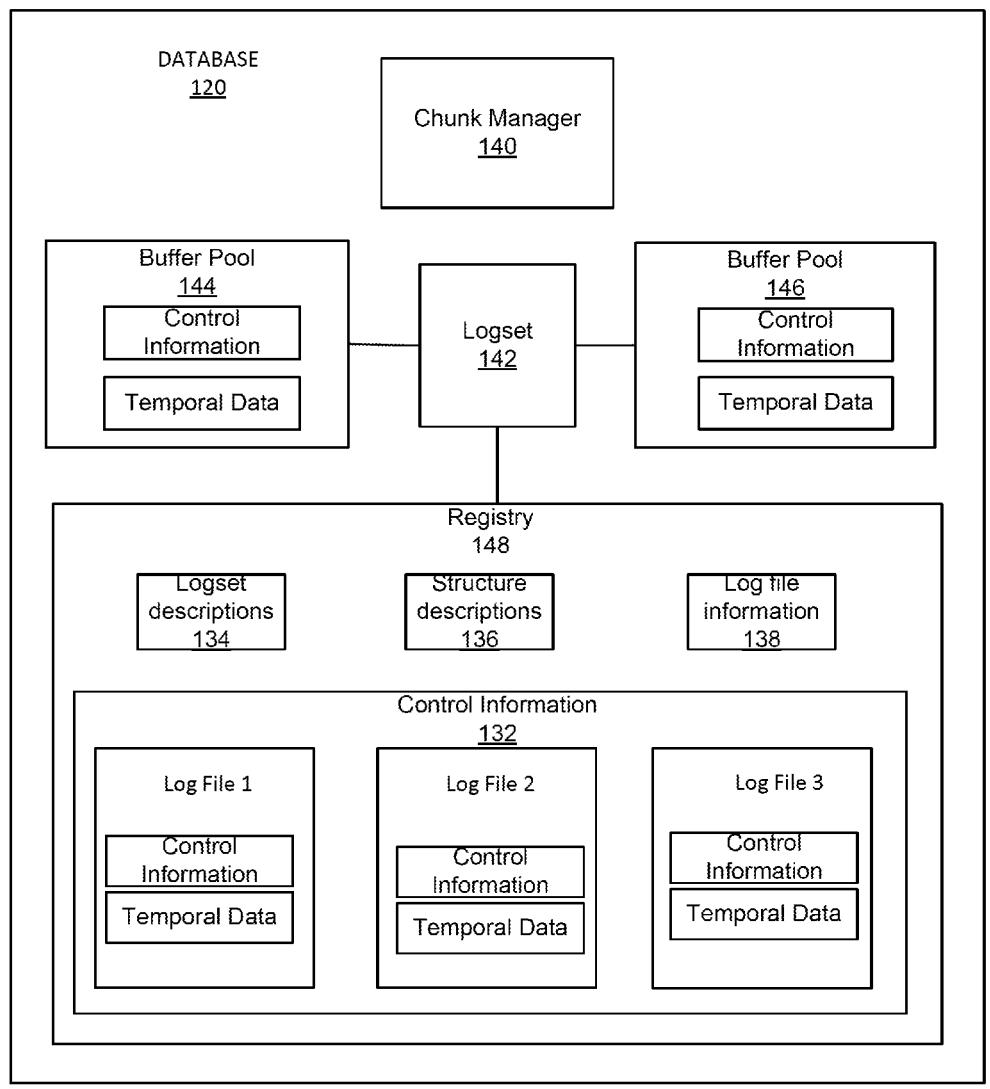
FIG. 3A is a schematic block diagram illustrating a database of the data collection system of FIG. 1.

The database 120 can use a log structure file system, which can be referred to as a logset. As shown in FIG. 3A, the database 120 includes a chunk manager 140, a logset 142, one or more buffer pools 144 and 146, and a registry 148. In some implementations, the buffer pool 144 can be for example, a read buffer pool and the buffer pool 146 can be, for example, a write buffer pool. The chunk manager 140 can be configured with a logging program to process insertion and retrieval requests and can communicate with the buffer pools 144, 146 to write and retrieve data records into the database 120. The buffer pools 144 and 146 can be maintained in the main memory 104 of the computing device 115 and can include multiple buffers to temporarily store data being written into and read from the logset 142 within substorage, such as, storage medium 108 (e.g., storage disk(s)).

For example, a data record being written or inserted into the database 120 is first placed in a buffer within one of the buffer pools 144, 146 in the main memory 104, and the data record is placed within a chunk (e.g., a group of data) with associated temporal data. The temporal data can be, for example, a date and/or time when the data record is logged into the buffer. In some implementations, the temporal data can be a date and/or time when the data record is placed into a chunk, or can be a date and/or time when the data record is placed in the log file. When the chunk is full, the chunk is moved to substorage (e.g., storage medium 108) within a log file of the logset 142. When a data record is being read from the database 120 (e.g., a retrieval request has been received), a chunk is moved from substorage 108 to the main memory 104 for examination to determine if the chunk meets the particular retrieval request specifications.

The logset 142 includes a collection of log files (e.g., Log File 1, Log File 2, Log File 3), and the log files can contain temporal data and control information associated with that log file. Only three log files are illustrated in FIG. 3A, but it should be understood that more than three log files can be included in the logset 142. The control information of the log file can include, for example, information such as index data associated with a chunk (see also FIGS. 5 and 6) and other information about the log file. The temporal data can include, for example a time range associated with the data records within a chunk (see also FIG. 7).

Control information 132 for the logset 142 can contain the log files (Log File 1, Log File 2, Log File 3) that are included in the logset 142 and can be maintained in the registry 148, as shown in FIG. 3A. The registry 148 can be used to store logset descriptions 134, structure (e.g., index) descriptions 136, and log file information 138, such as, for example, file name, last update date, etc.

Figure 3B:
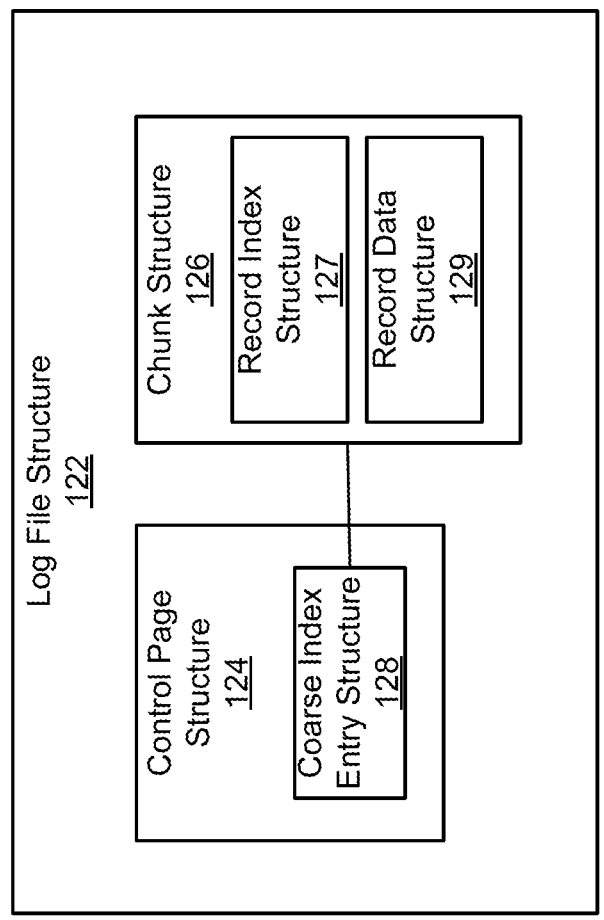
FIG. 3B is a schematic block diagram illustrating a log file, according to an implementation.

FIG. 3B illustrates an example of a log file structure 122 for a log file (e.g., Log File 1, Log File 2, Log File 3), and FIGS. 4-9 illustrate in more detail the various components of a log file structure 122. As shown in FIGS. 3B and 4, the log file structure 122 includes a control page structure 124 and one or more chunk structures 126 (only one chunk structure is shown in FIG. 3B for illustration purposes). The control page structure 124 (see also FIG. 5) includes a coarse index entry structure and a log data set area (LDSA) (shown in FIG. 7), which can include control information about the log file data. The chunk structure 126 (see also FIG. 6) includes a record index structure 127 (see also FIG. 9) and a record data structure 129 (see also FIG. 8).

As described above, a chunk is used as the basic unit to transfer data from a log file (e.g., Log File 1, Log File 2, Log File 3) stored in a substorage memory (e.g., storage medium 108) to a main memory (e.g., 104) of the data collection system 100 during retrieval of data, or from the main memory 104 to a substorage memory 108 during an insertion process. A chunk can include a group of stored data records. An example chunk structure is illustrated in FIG. 6. Each chunk can include data and index information for the data records within the chunk. The chunk size and number of chunks per log file can be defined by a user and can be optimized based on the anticipated transaction rates and the requirements for the particular application. The chunks can be retrieved from the substorage memory (e.g., storage medium 108) as a whole using an I/O request, for example, a single media manager multi-block I/O request. This can simplify above the bar (e.g., above 32 bit memory) buffer pool management. In some implementations, the chunk size can be user specified with a minimum 1 megabyte size. The chunk I/O operations can be performed, for example, using the specified chunk size.

Chunks can be controlled by a chunk directory (shown in FIG. 5), which can contain index information for each Chunk. Thus, each chunk within the log file can be represented by a chunk directory entry that contains index information for that chunk. FIG. 7 illustrates an example coarse index entry structure. A coarse index is an index associated with a chunk that is not an index entry for an exact data record. In other words, the coarse index can be associated with a chunk containing data records for a particular time range. The coarse index entry can point to a chunk, and then other criterion can be used to sort the data records within that chunk. For example, data received for transactions occurring during a particular time range can be placed or inserted within a chunk and a coarse index can be defined for that chunk. The coarse index entry structure (shown in FIG. 7) can contain hi-low values (e.g., a range or time period) associated with the data records within the chunk. In some embodiments, the same criterion (e.g., time/date information) used to identify a chunk containing the data record can be used to sort and search the data records within the chunk.

A chunk directory entry (shown in FIG. 5) can identify the time span of the data stored within a chunk, and contain pointers to the index and record data areas within the chunk. In some implementations, space within the database can be made available for reuse by locating the chunk with the oldest timestamp in the chunk directory, resetting the pointers to the index and record data areas within the applicable chunk directory entry, marking the chunk as empty, and writing or moving the chunk directory entry from the buffer pool memory (e.g., main memory) into the log file in disk storage. This, thereby orphans the index and record data (see e.g., FIGS. 8 and 9 for record data structure and record index structure respectively) within the chunk, and makes the entire chunk available for reuse. This technique can greatly minimize the overhead of a classic asynchronous housekeeping process, which is a known performance issue in temporal data structures that can use a significant amount of resources to continuously search for, reorganize, clear and queue available space to be reused to record subsequent records.

Each logset 142 within the database 120 can have a dedicated chunk directory, dedicated log files and above the bar buffer pools (e.g., buffer pools 144, 146). As each log file is opened, a chunk directory is allocated in storage for the log file so that the index information for that log file is available. Each logset 142 can be assigned a unique buffer pool (e.g., 144, 146) for writing and reading the log file. The number of buffers for the read and write buffers can be defined by a user.

The multilevel index structure described above for the database 120 can improve insert and retrieval times. The use of multilevel index structures is in contrast to true tree structures used in typical temporal storage databases. For example, overhead required to maintain a tree structure can be reduced during an insert activity. Indexing can be accomplished by maintaining indices at a log file level, chunk directory level, chunk directory entry level, and the lowest index at the chunk level. The log file level index and chunk directory index contain the lowest and highest time stamp for the log file. The chunk directory entry index contains the lowest and highest value for all data indices, and the chunk contains the indices for each data record.

When retrieving data from the database 120, chunk directory entries can be selected that contain data within the specified time span. Each chunk directory entry can contain a coarse index structure (FIG. 7) containing the high and low key values (e.g., high and low search criteria) for each unique key identification (id) occurring in the chunk. During a retrieval process, any chunk that can be identified as not containing the requested key ids or values (e.g., within the range specified) can be bypassed. The record level indices are stored within the chunk along with the associated data (see, e.g., FIGS. 5 and 6). In addition, read buffering and read ahead logic can be employed to increase performance when sequential access is requested for data retrieval.

In some implementations, user defined keys can be supplied to a logging program within the chunk manager 140 either by passing a buffer with the index information having been built dynamically, or having a static index structure defined for the logset 142. Static index structures can have multiple sets of indices defined for the logset 142 that map varying record types in the log file. A record type field can be supplied to the logging program to select the correct record type map for the data being logged for static definitions. For either the static or dynamic approaches, the record type can be logged with the record type and index information in the log file.

Figure 10:
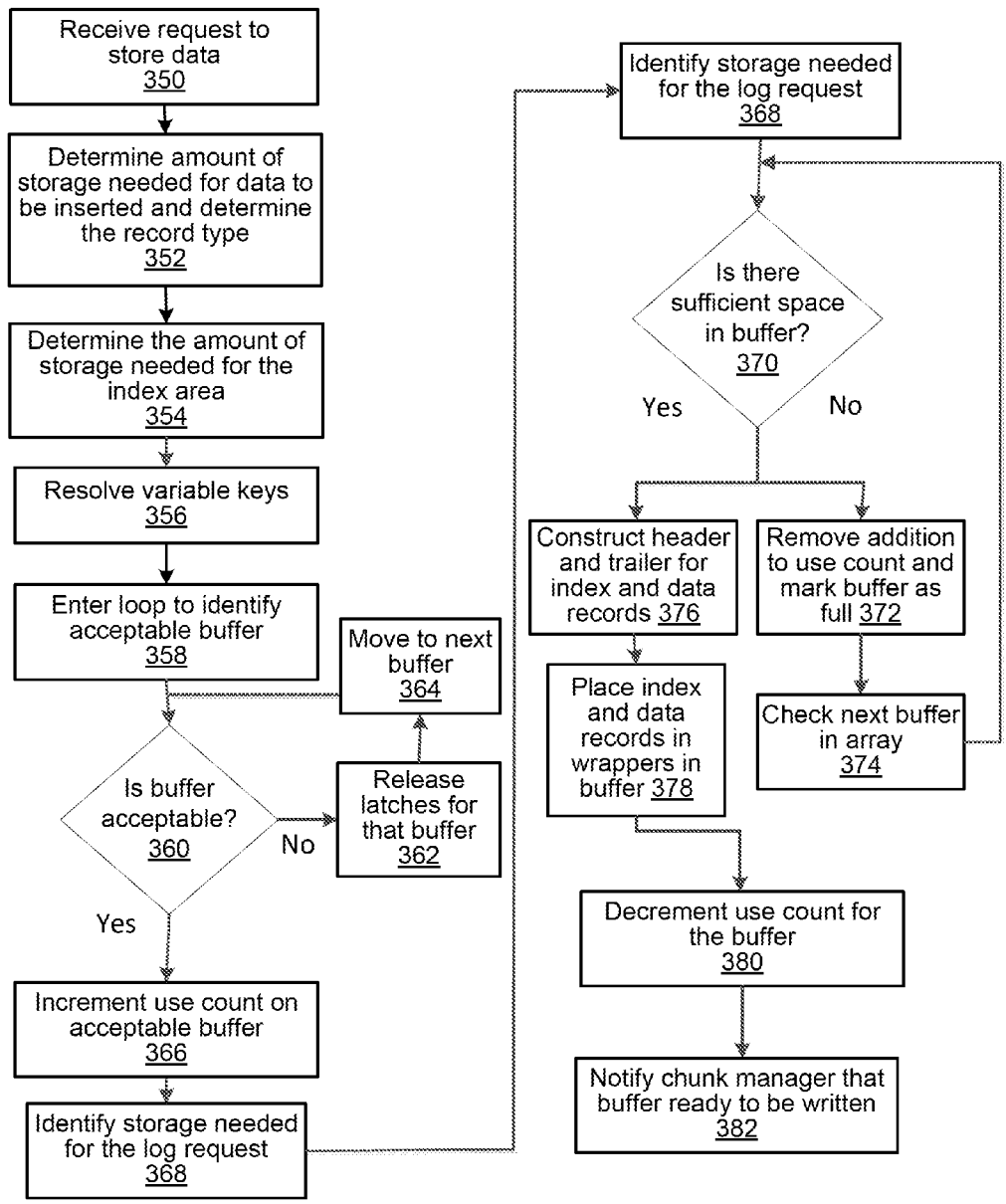
FIG. 10 is a flowchart illustrating a process of inserting data within a data collection system, according to an implementation.

FIG. 10 is a flowchart of a method of inserting data records into the database 120 of the data collection system 100. At 350, a request to store data can be received at the data collection system 100. At 352, after receiving the request, the chunk manager can determine an amount of storage required for the data to be inserted, and can review and evaluate the data record to determine a record type for the data. At 354, the chunk manager 140 can then determine the amount of storage required for the index area based on the amount of storage needed and the record type. If it is a dynamic index, the index can be copied to working storage (e.g., main memory 104). Next, at 356, variable keys can be resolved. For example, the chunk manager 140 can verify that the request is valid. A variable key can be control information associated with a data record. The control information can be, for example, a date or time period. Control information can also include other searchable criteria, such as for example, a zip code or an account number etc. associated with the data record.

At 358, a loop can then be entered in an attempt to place the record in a buffer in a buffer pool (e.g., buffer pool 144 or 146). At 360, a determination can be made as to whether a candidate buffer within the buffer pool is deemed acceptable for the data record. If a candidate buffer is deemed unacceptable for the request, latches for that buffer can be released at 362. For example, during the process to determine if a buffer is acceptable, the buffer can be locked or closed, such that it is unavailable to other data records attempting to be logged concurrently. If the buffer is deemed unacceptable for the particular data, the buffer can be unlocked such that it is available for other data records to be written to it. At 364, the search for an acceptable buffer can start over at the next buffer in the buffer pool. For example, the buffer currently being written to can be checked. If it is marked as full, the buffer can then be skipped and the next valid buffer can be checked. If the current buffer is acceptable, at 366 the use count for that buffer is incremented to indicate that the buffer is being accessed. This can prevent the chunk manager 140 from obtaining exclusive control of the buffer until interest in the buffer is removed. Once the use count has been updated, the address of a buffer control element associated with the buffer can be saved. If an abend occurs (i.e., if the process is halted due to an abnormal situation in the process, such as, for example, a machine (processor) check or error), the recovery logic of the chunk manager can remember to remove the update from the use count.

At 368, after the use count has been updated, the storage needed for the log request can be identified. A compare-and-swap instruction program can be used to account for other tasks that may be trying to update the buffer concurrently. For example if multiple data records are being concurrently uploaded, the compare-and-swap instruction program can ensure that multiple data records are not being written to the same buffer location. At 370, a determination is made to whether there is sufficient space in the buffer for the data records to be inserted. If there is insufficient space in the buffer for the log request, at 372, the addition to the use count is removed, and the "buffer full" indicator can be set for this buffer. Other concurrent tasks may have also found that that particular buffer is full. If the current task has set the flag (e.g., indicator) to "on" then the chunk manager 140 can be notified that there is a buffer ready to write to. If the current buffer has been marked as full, the next buffer in the buffer pool can be checked at 374. If no buffer is available, the requester can be notified with a buffer full condition.

When a buffer with suitable space has been found, access to this storage can be obtained as long as the use count for that buffer remains as is. At 376, a header and trailer for both the index and data records within the buffer are constructed. The header and trailer contain the same data, and are used to validate each other. At 378, the index and data records are placed within the boundaries defined by the header and trailer within the buffer. As described above, the record data structure and record index structure are defined within a chunk. Note that the last field set is the eye-catcher in the index header. This can prevent the data retrieval logic from accessing any part of this particular logged record until the update process is complete.

Any resources obtained by the request are released and this can ensure that any shared latches (counters or lock-outs) for a candidate buffer that were obtained on this request are released. At 380, the use count for the buffer is then decremented. At 372, if the write flag is on and there are no other users of the buffer, at 382, the chunk manager 140 is signaled that there is a buffer ready to be written. The chunk manager 140 can then write or move data records from the buffer to a log file within the subsystem storage (e.g., storage medium 108). Within the log file, the data records are defined within a chunk as described above with reference to FIGS. 3A, 3B and 4-9.

Figure 11:
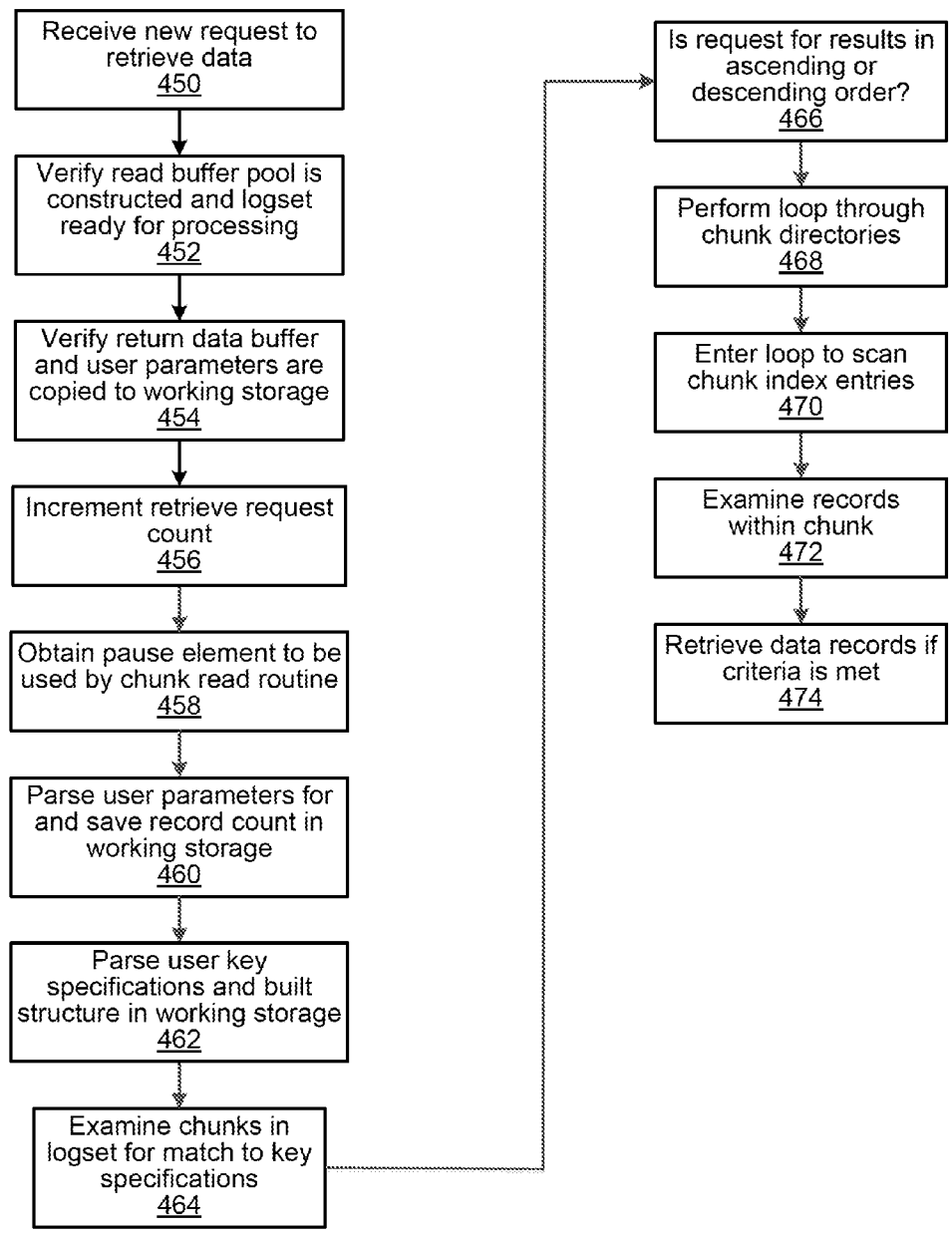
FIG. 11 is a flowchart illustrating a process of retrieving data within a data collection system, according to an implementation.
Figure 12:
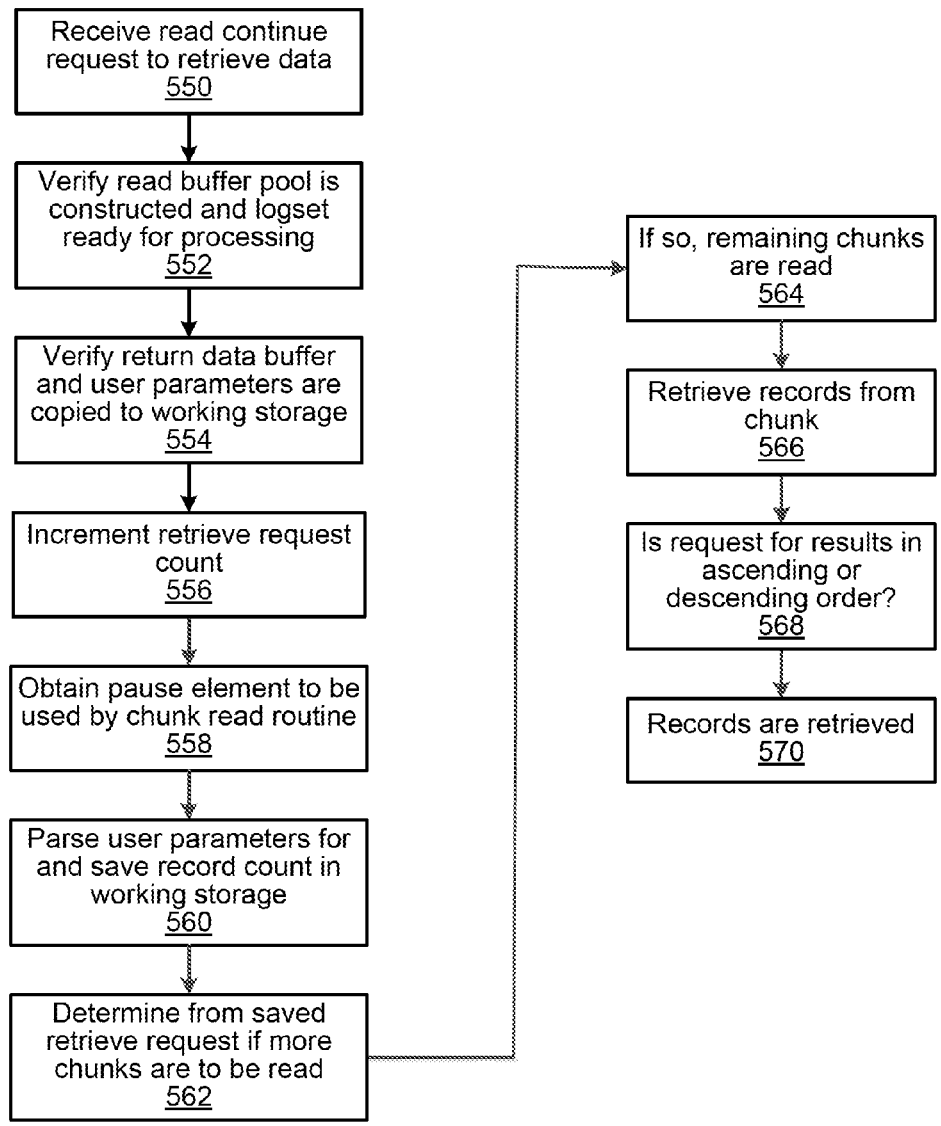
FIG. 12 is a flowchart illustrating a process of retrieving data within a data collection system, according to an implementation.

When a request to retrieve data records from the data collection system 100 are received, there are two types of data retrieval processes that can be performed. In a first type, a new request for data retrieval is received, and in a second type, a previous request for data retrieval is continued where the request had been terminated, for example, a request may have been terminated due to the client's buffer area being filled. FIG. 11 is a flowchart illustrating a method of processing a new request for retrieval of data (the first type) within a data collection system 100, and FIG. 12 is a flowchart illustrating a method of processing a continuing request (the second type) for data retrieval.

As shown in FIG. 11, a new data retrieval request can be received at 450. At 452, the chunk manager 140 can verify that a read buffer pool (e.g., buffer pools 144 or 146) is constructed and that the logset is ready for processing. If not, an error notification can be sent to the requester. At 454, the chunk manager 140 can verify that the requester has specified a return data buffer, and user parameters can be copied to working storage (e.g., main memory 104). At 456, a retrieve request count is incremented for statistics accounting. At 458, a pause element is obtained that can be used by the chunk read routine of the chunk manager 140. At 460, the user parameters can be parsed for a "maximum records to return" parameter, and the record count can be saved in working storage. For example, the maximum records return parameter can specify the maximum number of records to be returned to the requester. At 462, the user key specifications (e.g., the time span to be searched and other criteria) are parsed and a structure in working storage is built that will allow comparing the user keys (e.g., search criteria) to the record index information (see, e.g., FIG. 9).

At 464, the chunks within the logset are examined to see which chunks might possibly contain records that match the data retrieval request key specifications (e.g., the time period specified). This can be done by comparing the chunk's index range values (see, e.g., low value and high value shown in FIG. 7) to the key specifications of the request. The identified chunks can be moved from the substorage (e.g., disk storage 108) to the main memory 104 for processing. For example, the chunk manager can scan the write buffer pool within the main memory for a chunk(s) that meets the key specification and also scan the coarse index entry structures for a chunk(s) that meet the key specification. If a chunk(s) that meets the key specifications is found in the disks storage, it can be moved to main memory. At 466, a determination is made as to where to start the comparison based upon factors, such as, for example, whether the request is for ascending or descending order, and based on where the newest chunk was written by the chunk manager 140. At 468 a loop through each of the chunk directory entries (see, e.g., FIG. 5) can be performed until returning to the starting point (e.g., within the chunk). At 470, once a starting chunk directory entry is found to start the key search, a loop is entered to scan the chunk index entries (see, e.g., FIG. 5) to find a match for the request. At 472, the records within this chunk are examined to determine if it has the following:

examine the bit map of the chunk to determine if it contains any of the record types requested;

determine if all of the key specifications that all of the record types have in common could be contained within this chunk; and determine if all of the other key specifications that are valid for any of the requested record types could be contained within this chunk.

At 474, if the above determinations are met, the data records are retrieved from the chunk(s). For example, if the client wants the data returned in descending order, the unwritten records can be retrieved first. An unwritten record can be, for example, a record that is still in a buffer in main memory (e.g., write buffer pool) and that buffer has not yet been written to disk storage. Next, the records from the requested chunks from the scan can be retrieved. If the client wants the data returned in ascending order, the unwritten records are retrieved last. The records are then sent to a buffer on the client's computing device. Proper pointers can be maintained so that if the client buffer becomes full, a subsequent retrieve continue request (the second type) will be able to detect whether the retrieval was completed or if the search needs to restart at the point where the buffer was filled.

As shown in FIG. 12, if a read continue retrieval request can be initiated at 550. At 552, the chunk manager 140 can verify if a read buffer pool is constructed and if the logset is ready for processing. If not, in some embodiments, an error message can be sent to the requester. At 554, the chunk manager 140 can verify whether the requester has specified a return data buffer, and the user parameters can be copied to working storage. At 556, the retrieve request count can be incremented for statistics accounting. At 558, a pause element can be obtained that can be used by the chunk read routine within the chunk manager 140. At 560, the user parameters are parsed for maximum records to return parameter, and the record count can be saved in working storage. At 562, the chunk manager 140 can determine from the saved information from the previous read request, if more chunks are to be read. If so, at 564, the remaining chunks are read. At 566, the data records are retrieved from the chunk(s). If the client wants the data returned in descending order, the unwritten records are retrieved first, and then the records from the requested chunks from the scan are retrieved. If the client wants the data returned in ascending order, the unwritten records are retrieved last. Proper pointers are maintained so that if the client buffer becomes full, a subsequent retrieve continue request can detect whether the retrieval was completed or if it needs to restart at the point where the buffer filled.

FIG. 13 includes a summary table of the insertion rate results obtained in one example implementation of the optimized insertion process described herein. In this example use of the database system, repeatable results were produced that show that high insert rates into the log structure file system can be achieved, and those rates can be maintained as the number of concurrent task inserting into the same log structure file increases.

Figure 14:
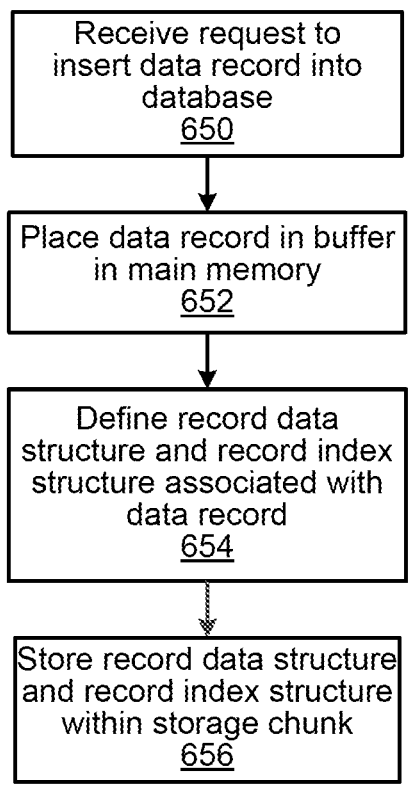
FIG. 14 is a flowchart illustrating a method of inserting a data record into a database of a data collection system.

FIG. 14 is a flowchart illustrating a computer-implemented method of inserting a data record into a database (e.g., 120) of a data collection system (e.g., 100), according to an implementation. The computer-implemented method can include at 650, receiving a request to insert a data record within a database of a data collection system. At 652, the data record is placed within a buffer in a main memory of the data collection system. At 654, a record data structure and a record index structure associated with the data record are each defined. At 656, the record data structure and the record index structure are stored within a storage chunk in a storage medium of the database. The storage medium can be different than the main memory storage of the data collection system. The storage chunk can have an associated index that can be used to retrieve the data record. The storage chunk can also include other data records different than the data record associated with the received request.

Figure 15:
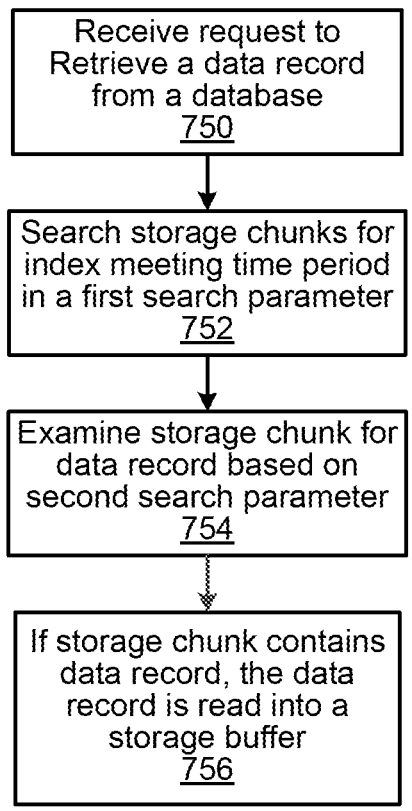
FIG. 15 is a flowchart illustrating a method of retrieving a data record from a database of a data collection system.

FIG. 15 is a flowchart illustrating a computer-implemented method of retrieving data from a database (e.g., 120) of a data collection system (e.g., 100), according to an implementation. The computer-implemented method can include at 750, receiving a request to retrieve a data record within a database of a data collection system. The request can include a first search parameter including a time period associated with the data record. At 752, a plurality of storage chunks within log file of the database are searched to identify a storage chunk that includes a storage chunk index that meets the time period identified in the first search parameter of the request. If a storage chunk from the plurality of storage chunks is identified that meets the time period associated with the first search parameter, at 754, the storage chunk can be examined to determine if the requested data record is stored within the storage chunk based on a second search parameter associated with the data record. If the storage chunk contains the requested data record, at 756, the data record is read into a storage buffer.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium) or in a propagated signal, for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method including executing, using at least one processor, instructions recorded on a non-transitory computer-readable storage medium, the method comprising:
   receiving a request to insert a data record within a database of a data collection system;
   placing the data record within a buffer in a main memory of the data collection system;
   selecting a record data structure and a record index structure associated with the data record;
   storing the record data structure and the record index structure within a particular storage chunk of a log file comprising a plurality of storage chunks, including the particular storage chunk, in a storage medium of the database, the storage medium being different than the main memory, wherein the particular storage chunk includes:

at least one associated coarse index that stores two index values, a low index value representing the lowest value stored in the chunk and a high index value representing the highest value stored in the chunk, and at least one associated index structure that includes the record index structure that can be used to retrieve the data record, and other data records different than the data record associated with the received request;

receiving a second request to retrieve data records from the data collection system, the second request including a first search parameter corresponding to the coarse index;

examining the coarse indexes of the plurality of storage chunks by looping through directory entries for the coarse indexes to identify storage chunks that meet the first search parameter of the second request; and when a storage chunk from the plurality of storage chunks is identified, examining the record index structure to determine data records responsive to the second request and retrieve the data records responsive to the second request.

2. The computer-implemented method of claim 1, further comprising:

prior to placing the data record in the buffer, identifying the buffer from a plurality of buffers within a buffer pool having sufficient storage space to place the data record.

3. The computer-implemented method of claim 1, wherein the low index value and the high index value represent a time corresponding to a period in which the data record was received at the database.

4. The computer-implemented method of claim 1, further comprising:

generating a header and a trailer associated with the record data structure; and placing the data record within the storage chunk within a boundary defined by the header and the trailer.

5. The computer-implemented method of claim 1, further comprising:

moving the particular storage chunk with the record data therein from the buffer to the storage medium.

6. The computer-implemented method of claim 1, wherein the associated index structure is a first associated index structure and storing the record data structure and the record index structure within the particular storage chunk includes:

determining that additional space in the database is needed;
identifying a second chunk with an oldest timestamp; and
replacing a pointer to an index structure associated with the second chunk with a pointer to the first associated index structure within the storage medium.

7. The computer-implemented method of claim 1, wherein the log file is part of a set that includes a plurality of log files, the log files having a respective associated coarse index.

8. The computer-implemented method of claim 1, wherein the record data structure and the record index structure associated with the data record are selected based on a record type of the data record.

9. The computer-implemented method of claim 1, wherein the log file is one of a plurality of log files, the log files of the plurality having at least one coarse index that stores a low index value representing the lowest value stored in the log file and a high index value representing the highest value stored in the log file.

10. A computer program product, the computer program product being tangibly embodied on a non-transitory computer-readable storage medium storing instructions that when executed cause a processor to perform a process, the instructions comprising instructions to:

receive at a data collection system, a first request to insert a data record within a database of the data collection system;

place the data record within a buffer in a main memory of the data collection system;

define a record data structure and a record index structure associated with the data record;

store the record data structure and the record index structure within a particular storage chunk of a log file comprising a plurality of storage chunks, including the particular storage chunk, in a storage medium of the database, the storage medium being different than the main memory, wherein the particular storage chunk includes:

at least one associated coarse index that stores two index values, a low index value representing the lowest value stored in the chunk and a high index value representing the highest value stored in the chunk, and at least one associated index structure that includes the record index structure that can be used to retrieve the data record, and other data records different than the data record associated with the first request; and receive a second request to retrieve data records from the data collection system, the request including a first search parameter corresponding to the coarse index;

examine the coarse indexes of the plurality of storage chunks to identify storage chunks that meet the first search parameter of the second request; and when a storage chunk from the plurality of storage chunks is identified, examine the record index structure to determine data records responsive to the second request and retrieve the data records responsive to the second request.

11. The computer program product of claim 10, further comprising instructions to:

prior to placing the data record in a buffer, identifying a buffer from a plurality of buffers within a buffer pool having sufficient storage space to place the data record.

12. The computer program product of claim 10, wherein the low index value and the high index value represent a time corresponding to the data record was received at the database.

13. The computer program product of claim 10, further comprising instructions to:

generating a header and a trailer associated with the record data structure; and place the data record within the storage chunk within a boundary defined by the header and the trailer.

14. The computer program product of claim 10, further comprising instructions to:

move the storage chunk with the record data therein from the buffer to the storage medium.

15. The computer program product of claim 10, wherein the associated index structure is a first associated index structure and storing the record data structure and the record index structure within the particular storage chunk includes:

determining that additional space in the database is needed;
identifying a second chunk with an oldest timestamp; and
replacing a pointer to an index structure associated with the second chunk with a pointer to the first associated index structure within the storage medium.

16. A data collection system comprising:
at least one processor;
a non-transitory storage medium different than main memory storing a log file for the data collection system, the log file comprising a plurality of storage chunks, wherein each storage chunk includes:

at least one associated coarse index that stores two index values, a low index value representing the lowest value stored in the chunk and a high index value representing the highest value stored in the chunk, at least one associated record index structure that can be used to retrieve data records stored in the chunk, and wherein the storage chunk includes a group of stored data records; and a memory storing instructions that, when executed by the at least one processor, cause the system to perform operations comprising:

receiving a request to retrieve data records from the log file, the request including a first search parameter corresponding to particular coarse indexes, examining the particular coarse indexes of the plurality of storage chunks to identify storage chunks that meet the first search parameter of the request, and when a storage chunk from the plurality of storage chunks is identified, examining the record index structure to determine data records from the group of data records responsive to the request and retrieving the data records responsive to the request.

17. The system of claim 16, wherein the first search parameter represents a time span and wherein the low index value and the high index value represent a time corresponding to a period in which the data record was received at the data collection system.

18. The system of claim 16, wherein the memory stores instructions that cause the system to further perform operations comprising:

prior to examining the record index structure, moving the storage chunk from a storage disk to a main memory of the data collection system.

19. The system of claim 16, wherein examining the coarse indexes includes looping through a directory entry associated with a respective storage chunk form the plurality of storage chunks and determining whether the first search parameter falls between the high index value and the low index value.

20. The system of claim 16, wherein the memory stores instructions that cause the system to further perform operations comprising:

prior to examining the coarse indexes, identifying a buffer pool within the data collection system configured to receive storage chunks.

21. The system of claim 16, wherein the log file is part of a set that includes a plurality of log files, the log files having a respective associated coarse index, and the memory stores instructions that cause the system to further perform operations comprising:

prior to examining the coarse indexes, examining the coarse index of the log files; and performing the examining of the coarse index for a storage chunk when the first search parameter falls between the high index value and the low index value of the coarse index for the log file.

22. The system of claim 16, further comprising:

determining if the received request includes a request for the data record in ascending or descending order; and determining a starting point for examining the coarse indexes based on whether the request is for the data record in ascending or descending order.

* * * * *